US 9,473,434 B2

(12) United States Patent
Hashimoto et al.

(10) Patent No.: US 9,473,434 B2
(45) Date of Patent: Oct. 18, 2016

(54) SYSTEM AND METHOD FOR UPDATING AN ATTACHMENT

(71) Applicants: Canon Information and Imaging Solutions, Inc., Melville, NY (US); Canon U.S.A., Inc., Melville, NY (US)

(72) Inventors: Hiroshi Hashimoto, Glen Cove, NY (US); Lessa Philip, East Meadow, NY (US)

(73) Assignees: Canon Information and Imaging Solutions, Inc., Melville, NY (US); Canon U.S.A., Inc., Melville, NY (US)

(*) Notice: Subject to any disclaimer, the term of this patent is extended or adjusted under 35 U.S.C. 154(b) by 267 days.

(21) Appl. No.: 14/081,660

(22) Filed: Nov. 15, 2013

(65) Prior Publication Data
US 2015/0142870 A1 May 21, 2015

(51) Int. Cl.
G06F 15/16 (2006.01)
G06F 15/177 (2006.01)
G06F 15/173 (2006.01)
H04L 12/58 (2006.01)

(52) U.S. Cl.
CPC .................................. *H04L 51/08* (2013.01)

(58) Field of Classification Search
CPC ....... H04L 29/06; H04L 29/08; H04L 12/58; H04L 67/02; H04L 67/10; H04L 67/22; H04L 67/26; H04L 67/28; H04L 67/289; H04L 67/2819; H04L 67/2842; H04L 67/2885; H04L 51/08; H04L 51/14; H04L 51/38; H04L 63/029; H04L 69/329
USPC .......................... 709/203–206, 220–223, 246
See application file for complete search history.

(56) References Cited

U.S. PATENT DOCUMENTS

| 5,604,860 | A | 2/1997 | McLaughlin et al. |
| 6,016,478 | A | 1/2000 | Zhang et al. |
| 6,401,131 | B1 | 6/2002 | Haverstock et al. |
| 6,678,705 | B1 | 1/2004 | Berchtold et al. |
| 7,069,240 | B2 | 6/2006 | Spero et al. |
| 7,103,835 | B1 | 9/2006 | Yankovich et al. |
| 7,197,502 | B2 | 3/2007 | Feinsmith |
| 7,281,049 | B2 | 10/2007 | Verma et al. |
| 7,424,543 | B2 * | 9/2008 | Rice, III ........... G06F 17/30194 348/734 |
| 7,443,548 | B2 | 10/2008 | Sprague et al. |
| 7,516,162 | B2 | 4/2009 | Mochizuki |
| 7,624,125 | B2 | 11/2009 | Feinsmith |
| 7,665,029 | B2 | 2/2010 | Nakajima |
| 8,051,430 | B2 | 11/2011 | Rapp |
| 8,139,256 | B2 | 3/2012 | Motamed |
| 8,151,204 | B2 | 4/2012 | Lusen et al. |
| 8,185,591 | B1 | 5/2012 | Lewis |

(Continued)

*Primary Examiner* — Farzana Huq
(74) *Attorney, Agent, or Firm* — Canon U.S.A., Inc., IP Division

(57) ABSTRACT

Methods, systems, and computer-readable media are provided. Some embodiments include receiving, at a first server from a client, a request to access a data object associated with an application on a second server. The first server sends a request for the data object to the second server and the first server receives the data object from the second server. The first server receives a first file from the client and determines whether a second file is attached to the data object. In response to determining that the second file is attached to the data object, the first server obtains the second file and generates a third file by merging the first file and the second file, and an update process is performed such that the third file is attached to the data object and the second file is not attached to the data object.

19 Claims, 8 Drawing Sheets

(56) References Cited

U.S. PATENT DOCUMENTS

| | | |
|---|---|---|
| 8,392,843 B2 | 3/2013 | Corona |
| 8,418,189 B2 | 4/2013 | Ishizuka |
| 2003/0115273 A1* | 6/2003 | Delia .................. G06Q 10/107 709/206 |
| 2004/0064733 A1* | 4/2004 | Gong .................. G06Q 10/107 726/27 |
| 2006/0074849 A1 | 4/2006 | Lee |
| 2007/0002392 A1 | 1/2007 | Ogura |
| 2007/0265969 A1 | 11/2007 | Horwat et al. |
| 2011/0179288 A1* | 7/2011 | Catrein .................. G06F 21/10 713/189 |
| 2012/0259876 A1 | 10/2012 | Mathai et al. |
| 2012/0290609 A1 | 11/2012 | Britt |
| 2013/0208324 A1 | 8/2013 | Isoda |

\* cited by examiner

SYSTEM AND METHOD FOR UPDATING AN ATTACHMENT

BACKGROUND OF THE INVENTION

1. Field of the Invention

The present invention relates generally to managing resources on a network, and more particularly to a system and method for updating an attachment.

2. Description of the Related Art

Computing systems are commonly used in a network environment to provide access to resources on the network. For example, a user on a client computing system may access an application on a server computing system in order to obtain information or utilize a feature of the application. The application executing on the server computing system may provide functionality enabling the user to perform one or more tasks. For example, a software application may provide tools for attaching a file to a data object in order to associate the file with the data object. By way of example, in an application for managing and processing expense reports, an electronic document including images of receipts may be attached to an expense report. A software application may further enable operations to be performed with respect to an attachment. For example, an application may enable the attachment to be downloaded.

In conventional systems, in order to modify an attachment, a user downloads the attachment, opens the file, and makes the desired modifications. Alternatively, a user could access the file at its storage location instead of downloading the file, and then make the modifications. Then the user saves the revised file. The user must then attach the revised file to the desired data object. Additionally, the user may need to remove the original attachment from the data object.

In some cases, a user may not be able to modify the attachment. For example, software running on a user's client device may not support the functionality required to make modifications to the attachment. If the client device supports software necessary for opening and editing the file, the user may install the software on the client device and then perform the steps required to modify the attachment. If the client device does not support the necessary software, the user must switch to an appropriate client device and then perform the steps required to modify the attachment.

BRIEF SUMMARY OF THE INVENTION

Methods, systems, and computer-readable media for updating an attachment are disclosed.

Some embodiments of the invention include receiving, at a first server computing system from a client computing system, a request to access a data object associated with an application on a second server computing system. The first server computing system sends a request for the data object to the second server computing system and the first server computing system receives the data object from the second server computing system. The first server computing system receives a first file from the client computing system and determines whether a second file is attached to the data object. In response to determining that the second file is attached to the data object, the first server computing system obtains the second file and generates a third file by merging the first file and the second file, and an update process is performed such that the third file is attached to the data object and the second file is not attached to the data object.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

Figure 1:
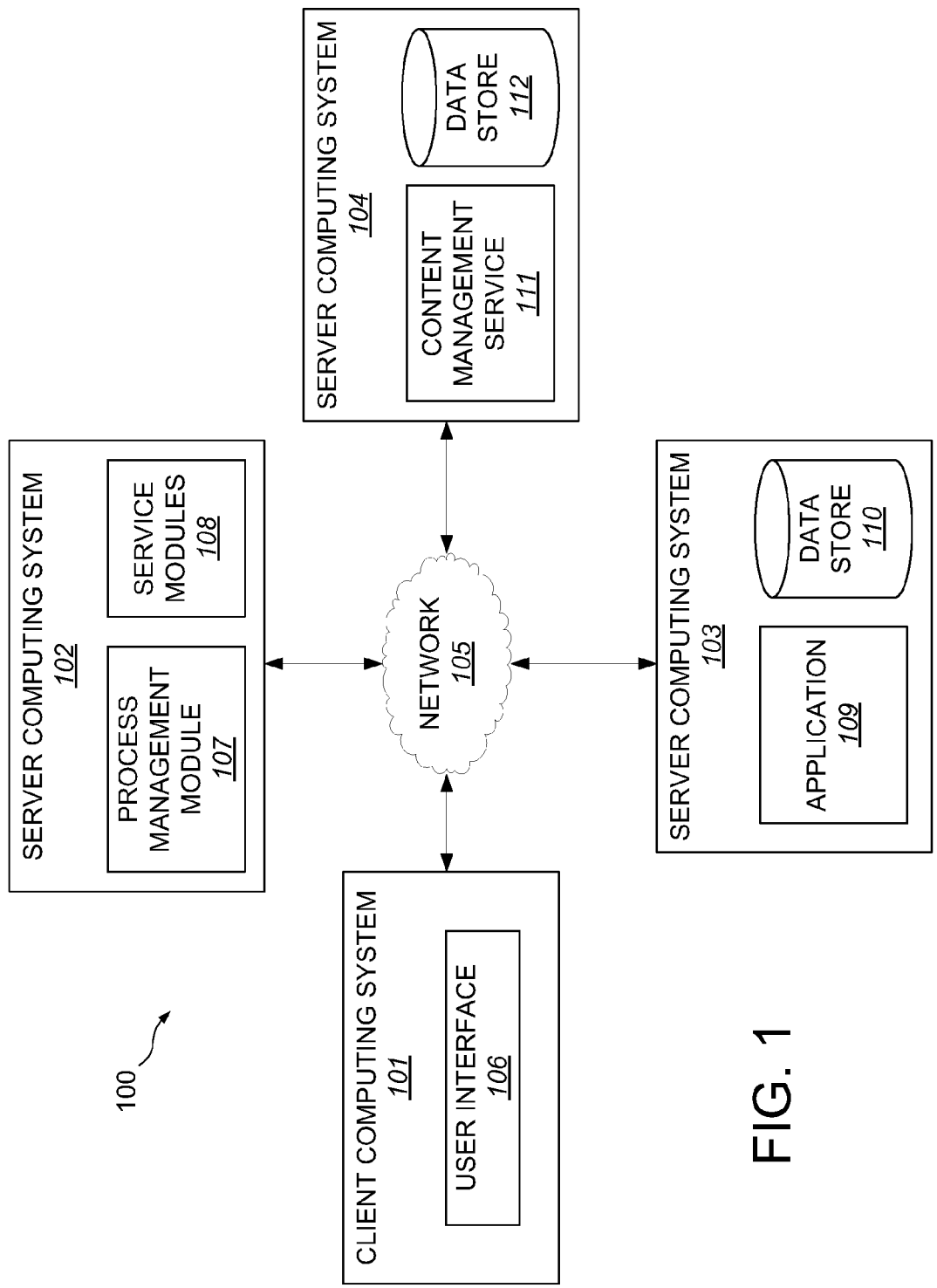
FIG. 1 illustrates an example network environment.

Embodiments of the present invention are described with reference to the drawings. FIG. 1 illustrates an example network environment 100. A client computing system 101 having a user interface 106, a server computing system 102 having a process management module 107 and service modules 108, a server computing system 103 having an application 109 and a data store 110, and a server computing system 104 having a content management service 111 and a data store 112 are connected to a network 105.

The client computing system 101 includes hardware, software, or both for providing the functionality of the client computing system 101. In some embodiments, the client computing system 101 is unitary. In some embodiments, the client computing system 101 is distributed. The client computing system 101 may span multiple machines.

The client computing system 101 includes the user interface 106. The user interface 106 includes hardware, software, or both for providing the functionality of the user interface 106. The user interface 106 may include an operation panel. The user interface 106 may output signals and receive input signals via the operation panel so as to facilitate interaction between a user and the client computing system 101. An operation panel may include a hard key panel and/or a touch sensitive display. A user may provide user input operations via the hard key panel and/or the touch sensitive display to control the client computing system 101 via the operation panel. For example, the user may press one or more hard buttons to issue one or more commands. Further by way of example, a user may provide a touch input to an interface element displayed on the display to issue a command and/or to make a selection. Moreover, the client computing system 101 may output information to the user and issue requests by outputting images on a display.

In some embodiments, a browser may execute on the client computing system 101. In some embodiments, the user interface 106 comprises information displayed by the browser. The browser may be a web browser such as MICROSOFT INTERNET EXPLORER or MOZILLA FIREFOX, and may be used to access a resource, such as a web page. The browser may enable a user to display and interact with text, images, form elements, or other information typically located on a web page served by a web server on the World Wide Web or a local area network. The browser may support various types of downloadable, executable, software modules, such as applets or plug-ins. For example, the browser may incorporate a virtual machine configured to execute a program, such as a JAVA applet, embedded in a web page accessed by the browser. The computing system 101 may have various add-ons, plug-ins, or other extensions for use in or with the browser.

In some embodiments, the client computing system 101 includes hardware, software, or both for providing scanning functionality. For example, the client computing system 101 may include an image sensor or a camera for capturing an image. In some embodiments, the client computing system 101 scans a physical document to generate electrical signals which are converted to digital image data representing the scanned physical document. The client computing system 101 may convert the digital image data into an electronic document representing the scanned physical document and send the electronic document to a destination.

The server computing system 102 includes hardware, software, or both for providing the functionality of the server computing system 102. The server computing system 102 may include one or more servers. For example, the server computing system 102 may include one or more application(s) servers, web servers, file servers, database servers, name servers, mail servers, fax servers, or print servers. In some embodiments, the server computing system 102 is unitary. In some embodiments, the server computing system 102 is distributed. The server computing system 102 may span multiple locations. The server computing system 102 may span multiple machines.

In some embodiments, the server computing system 102 performs one or more steps of one or more methods described or illustrated herein. In some embodiments, the server computing system 102 provides functionality described or illustrated herein. In some embodiments, software running on the server computing system 102 performs one or more steps of one or more methods described or illustrated herein or provides functionality described or illustrated herein. Particular embodiments include one or more portions of the server computing system 102.

The server computing system 102 may receive hypertext transfer protocol (HTTP) requests and provide HTTP responses. For example, the server computing system 102 may serve content in the form of a web page in response to a request from a web browser. The web page may be static or dynamic and may comprise Hyper Text Markup Language (HTML) files, or other suitable files, executable code, such as JAVASCRIPT, form elements, images, or other content. One or more elements of the web page content may be stored at the server computing system 102.

The server computing system 102 includes the process management module 107 and the service modules 108. The service modules 108 provide functionality to perform various operations. The process management module 107 manages the execution of processes by invoking one or more of the service modules 108 to perform operations during execution of a process. In some embodiments, one or more of the service modules 108 are implemented as web services.

The process management module 107 may include hardware, software, or both for providing the functionality of the process management module 107. The service modules 108 may include hardware, software, or both for providing the functionality of the service modules 108. In some embodiments, the process management module 107 and/or one or more of the service modules 108 executing on the server computing system 102 perform one or more steps of one or more methods described or illustrated herein or provide functionality described or illustrated herein. By way of example and not by way of limitation, the process management module 107 and/or one or more of the service modules 108 may include instructions which, when executed by one or more processors, cause the one or more processors to perform one or more operations described with respect to FIG. 2 and/or FIG. 4.

In some embodiments, the process management module 107 includes instructions and data for invoking respective services of one or more of the service modules 108. For example, the process management module 107 may be configured to send, to one of the service modules 108, a request for the service module to perform an operation specified in the request. In some embodiments, the request may include additional information, such as a portType element or other information associated with the particular service module. In some embodiments, the process management module 107 uses Simple Object Access Protocol (SOAP) to interact with the service modules 108.

In some embodiments, each of the service modules 108 includes instructions and data for performing one or more operations. In some embodiments, one or more of the service modules 108 include an interface described in Web Services Description Language (WSDL). One or more of the service modules 108 may use SOAP to receive and send messages. In some embodiments, one or more of the service modules 108 receive, from the process management module 107, a request to perform an operation specified in the request. Instructions for performing the requested operation are then executed in response to the request.

In some embodiments, one or more of the service modules 108 provide image processing functionality. For example, one or more of the service modules 108 may support one or more of the following operations: merging multiple files into a single file; splitting a file into multiple files; inserting a page in a file; extracting a page from a file; converting a format of a file to a different format; applying optical character recognition (OCR) processing on a file; and generating a file using one or more of a format file, a template file, an image file, and a graph data file.

In some embodiments, one or more of the service modules 108 provide functionality for interacting with an input/output device. For example, one or more of the service modules 108 may support one or more of the following operations: scanning a document at the input/output device and specifying a destination and file format for the resultant electronic document representing the scanned physical document; printing a file; and faxing a file.

In some embodiments, one or more of the service modules 108 provide functionality for accessing one or more resources of one or more external server computing systems. For example, one or more of the service modules 108 may support one or more of the following operations: uploading an electronic document; downloading an electronic document; adding an entry to a data store; deleting an entry from a data store; modifying an entry in a data store; searching for an entry in a data store; retrieving an entry from a data store; and managing a data object associated with an application on the external server computing system.

In some embodiments, the server computing system 102 accesses one or more resources on the network 105. In some embodiments, the server computing system 102 is configured to receive an electronic document representing a physical document scanned by the client computing device 101.

In some embodiments, the server computing system 102 is configured to access one or more resources of the server computing system 103 and/or the server computing system 104.

The server computing system 103 includes hardware, software, or both for providing the functionality of the server computing system 103. The server computing system 103 may include one or more servers. For example, the server computing system 103 may include one or more application(s) servers, web servers, file servers, database servers or mail servers. In some embodiments, the server computing system 103 is unitary. In some embodiments, the server computing system 103 is distributed. The server computing system 103 may span multiple locations. The server computing system 103 may span multiple machines.

The server computing system 103 includes the application 109 and the data store 110. These components of the server computing system 103 reside in the server computing system 103 in any suitable manner. For example, these components may reside on one or multiple servers. In some embodiments, one or both of these components may be provided as part(s) of a software application. In some embodiments, one or both of these components may be provided as a stand-alone software application.

The server computing system 103 provides access to the application 109. The application 109 includes programs and related data. The application 109 may include one or more programs for controlling access to the application 109 or for controlling access to one or more resources of the application 109. In some embodiments, the application 109 may use an authentication service to authenticate entities seeking access to resources of the application 109. In some embodiments, the application 109 includes functionality for controlling access to a resource of the application 109 based on a status of the resource. For example, an entity may be prevented from accessing a resource of the application 109 while another entity is executing a process associated with that resource.

In some embodiments, the application 109 executing on the server computing system 103 provides web server functionality. The application 109 may include one or more programs for receiving HTTP requests and providing HTTP responses. For example, the application 109 may serve content in the form of a web page in response to a request from a web browser. The web page may be static or dynamic and may comprise HTML files, or other suitable files, executable programs, form elements, images, or other content. One or more elements of the web page content may be stored at the server computing system 103. In some embodiments, the application 109 uses SOAP to receive and send messages.

In some embodiments, the application 109 is enterprise software. The application 109 may provide features to be used by an organization. In some embodiments, the application 109 executing on the server computing system 103 provides task-specific functionality. For example, the application 109 may include one or more programs enabling a user to perform one or more tasks. By way of example, and not by way of limitation, the application 109 may provide various functions, features and user interfaces for performing business-oriented tasks.

In some embodiments, the application 109 provides functionality for attaching a file to a data object. The file may be any suitable file able to be attached to the data object. The data object is information which may be incorporated in and/or used by the application 109. In some embodiments, the data object is information to which a file may be attached in the application 109. In some embodiments, the data object is processed as an entity distinct from other information or components incorporated in or used by the application 109. The data object may include information grouped together by the application 109. A representation of the data object may be presented in a graphical user interface (GUI) as a discrete unit, which may include one or more elements. In some embodiments, the data object may be stored in one or more locations. The data object may include one or more of the following: a data entry, a file, a portion of a file, executable code, a form element, an image, or other content.

The application 109 and the associated data object may be any suitable software application and data object, respectively. By way of example and not by way of limitation, the application 109 may be a travel and expense software application and the data object associated with the application may be an expense report. The travel and expense software application may provide functionality for attaching a file to the expense report. For example, an electronic document including images of scanned receipts may be attached to the expense report. Further by way of example, a file representing a scanned invoice may be attached to a data object that represents a supplier account in an accounts payable software application; a file representing a scanned work order may be attached to a data object that represents a customer account in a customer management software application; a file may be attached to a data object that represents a project or task in a project management software application; or a file may be attached to an electronic mail message in an electronic mail software application. The invention is not limited to the above examples. Other suitable files, data objects and associated applications than those recited herein are contemplated.

In some embodiments, the application 109 provides functionality for maintaining and accessing information stored in the data store 110. The application 109 may perform various operations with respect to the data store 110. Examples of operations include adding entries to the data store 110; deleting entries from the data store 110; modifying entries in the data store 110; searching for entries in the data store 110; and retrieving entries from the data store 110.

In some embodiments, information stored in the data store 110 may be grouped and organized hierarchically. Data entries may represent entities, attributes, values or other suitable information. The information in the data store 110 may be grouped in any suitable manner and may be grouped for any suitable reason, such as for implementing task-specific functionality of the application 109, or to correspond to an organization's structure. The data store 110 may include all or a portion of one or more data objects to which a file may be attached. Additionally, for a data object to which a file is attached, the data store 110 may include information associated with the attached file. For example, the data store 110 may include information that identifies the attached file and/or information for locating the attached file. The information associated with the attached file may include one or more of the following: a uniform resource locator (URL) of the file, a file name, a file path, or other suitable information.

The server computing system 104 includes hardware, software, or both for providing the functionality of the server computing system 104. The server computing system 104 may include one or more servers. For example, the server computing system 104 may include one or more application(s) servers, web servers, file servers, or database servers. In some embodiments, the server computing system 104 is unitary. In some embodiments, the server computing system 104 is distributed. The server computing system 104 may span multiple locations. The server computing system 104 may span multiple machines.

The server computing system 104 includes the content management service 111 and the data store 112. These components of the server computing system 104 reside in the server computing system 104 in any suitable manner. For example, these components may reside on one or multiple servers. In some embodiments, one or both of these components may be provided as part(s) of a software application. In some embodiments, one or both of these components may be provided as a stand-alone software application.

The server computing system 104 provides access to the content management service 111. The content management service 111 includes programs and related data. The content management service 111 may include one or more programs for controlling access to the content management service 111 or for controlling access to one or more resources of the content management service 111. In some embodiments, the content management service 111 may use an authentication service to authenticate entities seeking access to resources of the content management service 111. In some embodiments, the content management service 111 includes functionality for controlling access to a resource of the application 109 based on group membership information and/or permission information associated with a user.

In some embodiments, the content management service 111 executing on the server computing system 104 provides web server functionality. The content management service 111 may include one or more programs for receiving HTTP requests and providing HTTP responses. For example, the content management service 111 may serve content in the form of a web page in response to a request from a web browser. The web page may be static or dynamic and may comprise HTML files, or other suitable files, executable programs, form elements, images, or other content. One or more elements of the web page content may be stored at the server computing system 104. In some embodiments, the content management service 111 uses SOAP to receive and send messages.

In some embodiments, the content management service 111 is enterprise software. The content management service 111 may provide features enabling content to be shared across an organization. For example, the content management service 111 may include functionality for receiving, storing, organizing, and providing access to information, files, or other content for members of an organization or group.

In some embodiments, the content management service 111 provides functionality for maintaining and accessing information stored in the data store 112. The content management service 111 may perform various operations with respect to the data store 112. Examples of operations include adding entries to the data store 112; deleting entries from the data store 112; modifying entries in the data store 112; searching for entries in the data store 112; and retrieving entries from the data store 112.

In some embodiments, the content management service 111 provides functionality for storing a file in the data store 112 and for retrieving a file from the data store 112. The file may be an electronic document or other suitable file. Additionally, the content management service 111 may provide functionality for storing information associated with the file in the data store 112. Examples of information associated with the file include information that identifies the file, information for locating the file, and information about the file. In some embodiments, the content management service 111 performs operations for adding one or more of the following entries to the data store 112: a URL of the file, a file name, and a description of the file.

The information in the data store 112 may be organized in any suitable manner and may be grouped for any suitable reason, such as to correspond to an organization's or a group's structure, or in accordance with user settings. In some embodiments, the data store 112 includes a file that is an attachment to a data object associated with the application 109 on the server computing system 103.

In some embodiments, one or both of the content management service 111 and the data store 112 may reside in the server computing system 102; and/or one or more operations performed by the server computing system 104 may be performed by the server computing system 102. For example, the content management service 111 and the data store 112 may be included in the server computing system 102 instead of in a separate server computing system 104, according to some embodiments.

The network 105 couples one or more servers and one or more clients to each other. The network 105 may be any suitable network. For example, one or more portions of the network 105 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 105 may include one or more networks.

Figure 2:
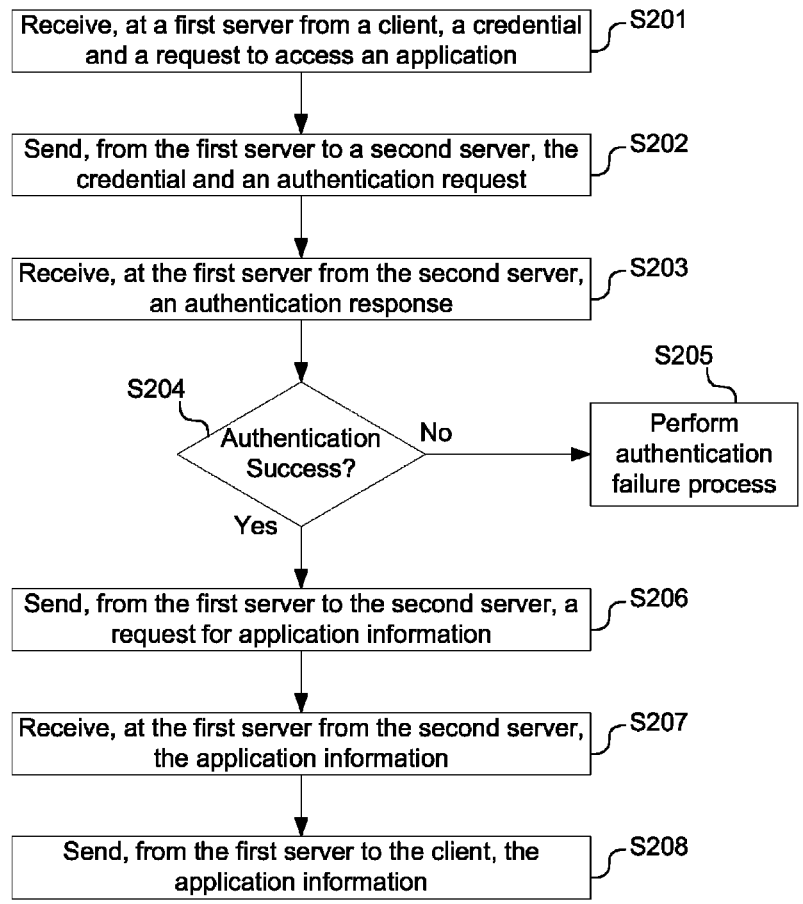
FIG. 2 illustrates an example flow of operations at a server computing system.

FIG. 2 is described with reference to the example network environment 100 of FIG. 1. FIG. 2 illustrates an example flow of operations at the server computing system 102.

In step S201, the server computing system 102 receives from the client computing system 101 a credential and a request to access the application 109. For example, the server computing system 102 may host a web page that enables a user to sign in to the application 109. The web page may include form elements for inputting a credential such as a user name and password. In some embodiments, the server computing system 102 receives from a browser executing on the client computing system 101 a request to access the web page. In response to the request, the server computing system 102 may send to the client computing system 101 the web page. Then, the client computing system 101 may receive the credential. For example, a user may provide the credential via the user interface 106 of the client computing system 101. The credential may be a username and password. Once the credential is submitted, a browser executing on the client computing system 101 may send the credential to the server computing system 102.

In step S202, the server computing system 102 sends to the server computing system 103 the credential received in step S201 and an authentication request. In response to the authentication request, the server computing system 103 may perform operations to determine whether the credential is valid and then send to the server computing system 102 an authentication response based on the determination.

In some embodiments, the server computing system 103 uses a remote authentication service to determine whether the credential is valid. For example, the server computing system 103 may send the credential to an authentication service with a request to authenticate the user. The authentication service may use the Kerberos protocol or other suitable authentication method to authenticate the user. The authentication service then sends an authentication response to the server computing system 103 indicating whether the authentication was successful or the authentication failed. If the authentication was successful, the server computing system 103 determines that the credential is valid and sends an authentication success response to the server computing system 102. On the other hand, if the authentication failed, the server computing system 103 determines that the credential is not valid and sends an authentication failure response to the server computing system 102.

In some embodiments, the server computing system 103 determines whether the credential is valid by comparing the credential to user information on an access control list stored locally. In some embodiments, the data store 110 includes the access control list. Based on the comparison, the server computing system 103 may determine, for example, the credential is valid in a case the credential matches some user information on the access control list, or the credential is not valid in a case the credential does not match some user information on the access control list. If the credential is valid, the server computing system 103 sends an authentication success response to the server computing system 102. On the other hand, if the credential is not valid, the server computing system 103 sends an authentication failure response to the server computing system 102.

In step S203, the server computing system 102 receives the authentication response from the server computing system 103. If the authentication response indicates that authentication was not successful (no in step S204), the process continues to step S205. In step S205, the server computing system 102 performs processing in response to the authentication failure. For example, the server computing system 102 may prepare and send to the client computing system 101 information that, when displayed at the client computing system 101, provides a message to a user that authentication has failed or that the user is denied access to one or more resources of the application 109. The message may include a request that the user provide a credential again, for example. On the other hand, if the authentication response indicates that authentication was successful (yes in step S204), the process continues to step S206.

In step S206, the server computing system 102 sends to the server computing system 103 a request to access one or more resources of the application 109. In some embodiments, the request comprises a request for information about one or more data objects associated with the application 109. In some embodiments, the request comprises a request to search for information in the data store 110 and/or to retrieve information from the data store 110. In some embodiments, the request comprises a request for information associated with the user corresponding to the credential sent in step S202. For example, the server computing system 102 may request a list of data objects associated with the account of the signed-in user. In some embodiments, the request comprises a request for a file that may be displayed by a web browser.

In step S207, the server computing system 102 receives from the server computing system 103 the information requested in step S206. For example, in response to the request sent in step S206, the server computing system 103 may perform operations to collect the requested information and then send the requested information to the server computing system 102.

In step S208, the server computing system 102 sends to the client computing system 101 one or more resources of the application 109. The information sent in step S208 may include information about one or more data objects associated with the application 109. In some embodiments, the information sent in step S208 includes information associated with the account of the signed-in user. In some embodiments, the server computing system 102 sends to the client computing system 101 all of the information received in step S207. In some embodiments, the server computing system 102 sends to the client computing system 101 a portion of the information received in step S207. In some embodiments, the server computing system 102 sends to the client computing system 101 at least a portion of the information received in step S207 and, additionally, the server computing system 102 sends to the client computing system 101 information different from the information received in step S207.

In some embodiments, step S208 comprises the server computing system 102 sending to the client computing system 101 information that, when displayed at the client computing system 101, provides a GUI. For example, the server computing system 102 may send a web page or other suitable file(s) and/or information for providing a GUI at the client computing system 101. In some embodiments, the information sent in step S208 provides one or more interface elements enabling a user at the client computing system 101 to select a data object and send, from the client computing system 101 to the server computing system 102, information indicating selection of the data object.

Figure 3:
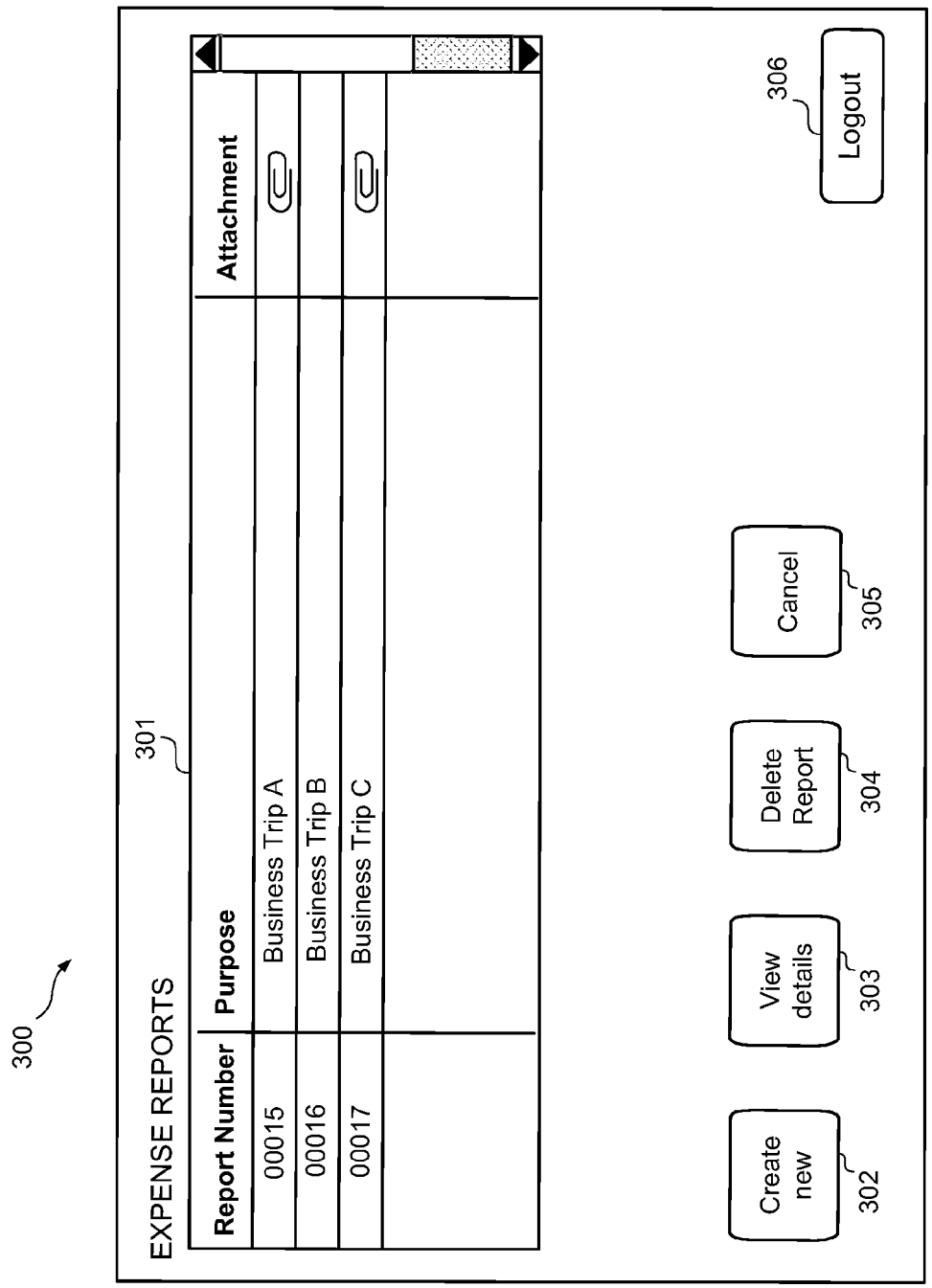
FIG. 3 illustrates an example graphical user interface (GUI) on a display of a client computing system.

FIG. 3 illustrates an example GUI on a display 300 of the client computing system 101. The example GUI shows a screen that includes information about expense reports. In some embodiments, the information about expense reports was received by the server computing system 102 from the server computing system 103 at step S207 and sent from the server computing system 102 to the client computing system 101 at step S208. The expense reports may be associated with a travel and expense software application on the server computing system 103.

In some embodiments, the example GUI of FIG. 3 is rendered when a browser displays the information sent in step S208 on the display 300. In some embodiments, the display 300 comprises a touch sensitive element operable to receive user inputs or commands based on the touching of interface elements presented in the GUI on the display 300. The interface elements may be graphical objects displayed on the display 300.

The example GUI includes a window 301 and buttons 302-306. The window 301 includes the following information for each of the expense reports: Report Number, Purpose, and Attachment. The Report Number field contains information that identifies an expense report; the Purpose field contains information that describes an attribute of an expense report; and the Attachment field contains information that indicates whether a file is attached to an expense report. The Report Number field and the Purpose field of the respective expense reports are interface elements which may be touched to designate selection of the corresponding expense report. Upon selection of an expense report, the appearance of the expense report may be changed in the GUI in any suitable manner to indicate the status of the selected expense report.

Each of the buttons 302-306 is an interface element. The buttons 302-306 provide the following functionality: button 302 creates a new expense report; button 303 issues a request to view details about a selected expense report; button 304 deletes a selected expense report; button 305 exits the expense report page; and button 306 will log out the user. Button 303 and button 304 operate in conjunction with a user-selection of an expense report listed in the window 301. A user may view additional information for an expense report by touching the Report Number field or the Purpose field of the expense report and button 303. Likewise, a user may delete an expense report by touching the Report Number field or the Purpose field of the expense report and button 304.

A scrollbar is also provided on the right side of the window 301 to enable the user to view all available expense reports when the size of the window 301 is insufficient to display all available expense reports in the window 301. Expense reports may be included in the list in the window 301 for any suitable reason or combination of reasons. For example, expense reports may be included if a user action is required, the expense report has not yet been submitted, or other reason(s).

Figure 4:
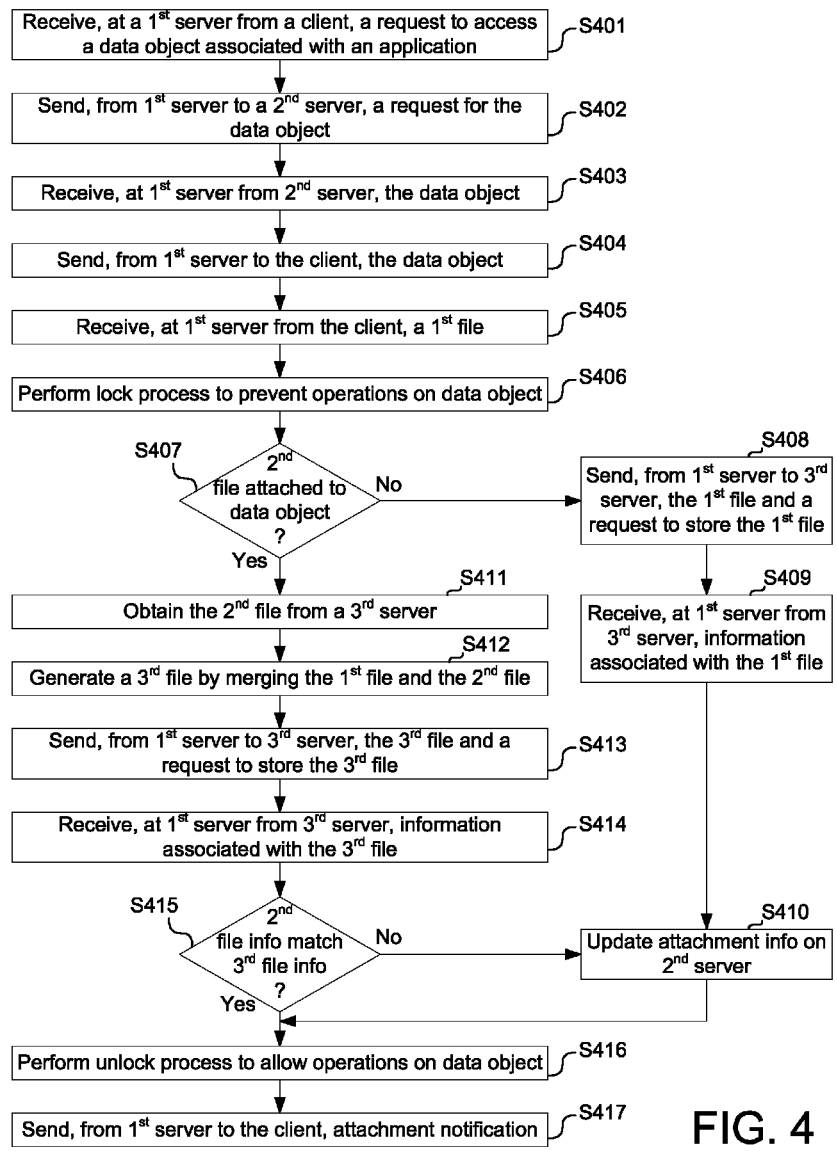
FIG. 4 illustrates an example flow of operations at a server computing system.

FIG. 4 is described with reference to the example network environment 100 of FIG. 1. Additionally, steps of FIG. 4 are described with reference to one or more of the example GUIs of FIGS. 3, 5, and 6. However, the invention is not limited to the particular implementations of FIGS. 3, 5, and 6. Other suitable implementations are contemplated. FIG. 4 illustrates an example flow of operations at the server computing system 102.

In step S401, the server computing system 102 receives from the client computing system 101 a request to access a data object associated with the application 109 on the server computing system 103. In some embodiments, the request to access the data object is based on one or more user inputs to one or more interface elements presented in the user interface 106 of the client computing system 101. For example, a user may select an interface element in a GUI on a touch sensitive display by touching a portion of the display where the interface element is presented. The interface element may be associated with the data object to which the user is seeking access, and the interface element may provide functionality for sending the request to access the data object. Step S401 is described further with reference to the example GUI of FIG. 3.

Referring to FIG. 3, the client computing system 101 may receive a user input to a Report Number field or a Purpose field of an expense report on the display 300 and, additionally, a user input to the View details button 303. For example, in order to issue a request to view details about the expense report having "00017" as its Report Number, a user may select expense report "00017" by providing a user input to the Report Number field having identifier "00017" or the Purpose field having identifier "Business Trip C" and, additionally, a user input to the View details button 303.

In step S402, the server computing system 102 sends to the server computing system 103 a request for the data object for which an access request was received in step S401. In some embodiments, the request comprises a request to search for the data object in the data store 110 and/or to retrieve the data object from the data store 110. Referring to FIG. 3, by way of example, if a request were issued to view details about expense report "00017," then step S402 may comprise the server computing system 102 sending to the server computing system 103 a request for the expense report "00017."

In step S403, the server computing system 102 receives from the server computing system 103 the data object requested in step S402. In step S404, the server computing system 102 sends to the client computing system 101 the data object received in step S403. Step S404 is described further with reference to the example GUI of FIG. 5.

Figure 5:
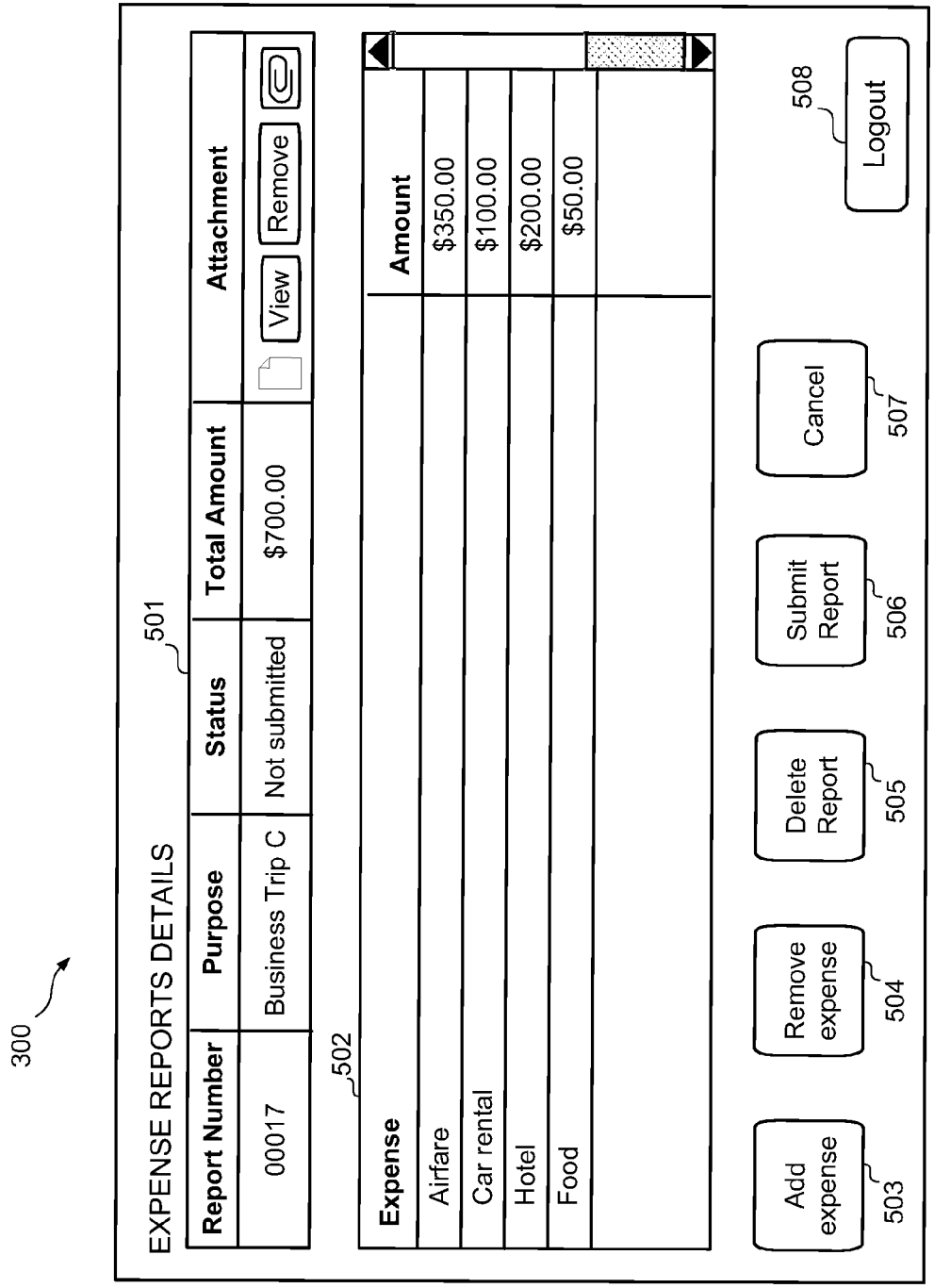
FIG. 5 illustrates an example GUI on a display of a client computing system.

FIG. 5 illustrates an example GUI on the display 300 of the client computing system 101. In some embodiments, the example GUI of FIG. 5 is rendered when a browser displays the data object sent in step S404 on the display 300. The GUI of FIG. 5 shows a screen displayed based on a user selection, in the GUI of FIG. 3, to view details about expense report "00017." Accordingly, the GUI of FIG. 5 shows a screen that includes details about the expense report "00017." The example GUI of FIG. 5 includes a first window 501, a second window 502, and buttons 503-508.

The first window 501 includes the following information about expense report "00017": Report Number, Purpose, Status, Total Amount, and Attachment. The Report Number field contains information that identifies the expense report. In the example GUI of FIG. 5, the Report Number field includes identifier "00017." The Purpose field contains information that describes an attribute of the expense report. For example, the Purpose field may include information that provides a business reason or justification for the expense report. The Status field contains information that describes a status of the expense report. In the example GUI of FIG. 5, the Status field includes a textual message "Not submitted" indicating the expense report has not yet been submitted. The Total Amount field contains information that indicates a total amount of money associated with the expense report, where the total amount of money is a summation of the expenses entered for the expense report. The Attachment field contains interface elements which provide functionality associated with an attachment. In the example GUI of FIG. 5, the Attachment field contains a document icon, a View button, a Remove button, and a button to add an attachment. The document icon provides functionality to download an attachment. The View button provides functionality to view the attachment. The Remove button provides functionality to remove the attachment such that the attached file will no longer be attached to the expense report. The button to add an attachment provides functionality to attach an additional file to the expense report.

The second window 502 includes information about expenses entered for the expense report. The second window 502 includes Expense fields and Amount fields. The Expense fields contain information that describes attributes of respective expenses. For example, each Expense field may include information that describes or identifies a business expense. Each Amount field contains information that indicates an amount of money associated with a corresponding expense. A scrollbar is also provided on the right side of the window 502 to enable the user to view all available expenses when the size of the window 502 is insufficient to display all expenses associated with the expense report.

Each of the buttons 503-508 is an interface element. The buttons 503-508 provide the following functionality: button 503 is for adding a new expense in the window 502; button 504 removes a selected expense from the window 502; button 505 deletes the expense report (for example, the expense report "00017" may be deleted by selecting the Delete Report button 505 in the example GUI of FIG. 5); button 506 submits the expense report (for example, the expense report "00017" may be submitted by selecting the Submit Report button 506 in the example GUI of FIG. 5); button 507 exits the expense report page (for example, the Cancel button 507 may exit the expense report page for expense report "00017" and then cause the example GUI of FIG. 3 to be displayed); and button 508 will log out the user. Button 504 operates in conjunction with a user-selection of an expense listed in the window 502. For example, a user may remove an expense from the window 502 by touching the expense to select the expense and then by touching the Remove expense button 504.

The first window 501, the second window 502, and the buttons 503-508 in the example GUI of FIG. 5 contain examples of information and functionality that may be provided in the GUI. However, any suitable GUI may be utilized, including a GUI having more or less information, features, and/or interface elements than provided in the example GUI 500; and/or a GUI having information, features, and/or interface elements different from that which is provided in the example GUI 500. For example, in some embodiments, the Attachment field contains one or more, but not all, of the document icon, the View button, the Remove button, and the button to add an attachment. In some embodiments, the Attachment field contains information that indicates that a file is attached to the expense report but the Attachment field does not contain one or more of the document icon, the View button, the Remove button, and the button to add an attachment.

In step S405, the server computing system 102 receives a file from the client computing system 101. In some embodiments, the file is an electronic document. For example, the file may be an electronic document representing a physical document the client computing system 101 scanned. In some embodiments, the client computing system 101 includes an image sensor or a camera for capturing an image. For example, the client computing system 101 may be a multifunction peripheral having a scanning function, a copier, a mobile computing system (for example, a mobile telephone, a personal digital assistant (PDA), a tablet computer system, a laptop computer system, or other device) having a camera, or other device having operable to capture an image. The file may be a Portable Document Format (PDF) file, an image file, or other suitable file.

In some embodiments, in response to scanning a physical document, the client computing system 101 automatically sends, from the client computing system 101 to the server computing system 102, an electronic document representing the scanned physical document. For example, information sent with the data object in step S404 may include computer-executable instructions that, when executed at the client computing system 101, cause the client computing system 101 to send the scanned physical document to the server computing system 102 in response to a scanning operation executed at the client computing system 101. In some embodiments, a GUI such as the example GUI of FIG. 5 is rendered when a browser displays the data object sent in step S404; and a user may initiate a scanning operation while the GUI is displayed. Then, in response to the scanning operation while the GUI is displayed, the client computing system 101 may automatically send, from the client computing system 101 to the server computing system 102, an electronic document representing the scanned physical document. Then the server computing system 102 receives the electronic document in step S405, according to some embodiments.

In some embodiments, in response to a user selection of a file, the client computing system 101 automatically sends the file to the server computing system 102. For example, a user may select an interface element displayed in a GUI, such as the button to add an attachment which is presented in the Attachment field in the first window 501 of the example GUI of FIG. 5. Then a user may be presented with a list of files or may browse to a list of files and select a file from the list. The selected file may then automatically be sent to the server computing system 102. Then the server computing system 102 receives the selected file in step S405, according to some embodiments.

In step S406, the server computing system 102 performs a process to lock the data object for which an access request was received in step S401. In some embodiments, the server computing system 102 sends to the server computing system 103 a request to prevent a client computing system, different from the client computing system 101, from accessing the data object for performing operations with respect to the data object. The server computing system 102 may then receive from the server computing system 103 a response indicating the data object is locked such that access to the data object for performing operations with respect to the data object is prevented. By way of example, while the data object is locked, a client computing system different from the client computing system 101 may be prevented from accessing the data object to make changes to the data object, such as adding a data entry or modifying a data entry associated with the data object. Further by way of example, while the data object is locked, the data object may be prevented from being submitted for processing or review at another computing system. For example, the data object may be an expense report and the expense report may be prevented from being submitted for processing and/or approval while the expense report is locked.

In some embodiments, the process to lock the data object at step S406 is executed in response to the receiving the file at the server computing system 102 in step S405. In some embodiments, the process to lock the data object at step S406 is executed in response to the initiation of a process to attach a file to the data object.

In step S407, the server computing system 102 determines whether a file is attached to the data object. The file received at the server computing system 102 in step S405 is a first file and, in step S407, the server computing system 102 determines whether a second file, different from the first file, is attached to the data object.

In some embodiments, the server computing system 102 determines that the second file is attached to the data object based on information included in the data object. For example, the data object may include information associated with the second file, such as a URL of the second file, a file name of the second file, a file path of the second file, or other information associated with the second file. In a case that the data object includes the information associated with the second file, such as a URL, the server computing system 102 determines that the second file is attached to the data object. In some embodiments, the server computing system 102 determines that the second file is attached to the data object based on information that indicates the data object includes an attachment, such as a flag or other indicator. For example, the data object may include the information that indicates a file is attached to the data object.

In some embodiments, the information associated with the file (such as a URL) and/or the information indicating the data object includes an attachment (such as a flag) may be included in the data object received in step S403. In some embodiments, step S407 includes sending, from the server computing system 102 to the server computing system 103, a request for the information associated with the file (such as a URL) and/or for information indicating whether data object includes an attachment; and receiving, at the server computing 102 from the server computing system 103, the requested information.

In some embodiments, the processing performed in step S407 is executed in response to receiving a request to access a data object in addition to receiving a file to be attached to the data object. For example, receiving the request to access the data object in step S401 and receiving the file in step S405, in combination, may cause the server computing system 102 to execute the processing of step S407.

In response to determining that a second file is attached to the data object (yes in step S407), the process advances to step S411. On the other hand, in response to determining that a second file is not attached to the data object (no in step S407), the process advances to step S408. By way of example, in the example GUI of FIG. 3, the expense report having "00016" as its Report Number does not have an attachment. This is indicated by the lack of an icon in the Attachment field associated with expense report "00016" in the example GUI of FIG. 3. Accordingly, in a case a user selected expense report "00016," in the GUI of FIG. 3, then in step S407, the server computing system 102 determines that a second file is not attached to the data object, and the process advances to step S408, according to embodiments.

In step S408, the server computing system 102 sends to the server computing system 104 the file received in step S405 and a request to store the file. In step S409, the server computing system 102 receives from the server computing system 104 information associated with the file. The information associated with the file may be a URL of the file, a file name, a file path, or other information associated with the file. By way of example, the server computing system 104 may store the file, sent in step S408, in the data store 112 and send information, such as a URL, to the server computing system 102. The information associated with the file may be used for identifying and/or locating the file.

In step S410, the server computing system 102 performs a process to update attachment information on the server computing system 103. In some embodiments, step S410 includes the server computing system 102 sending to the server computing system 103 a request to store, in the data store 110, information associated with a file. For example, in some embodiments, the server computing system 102 sends to the server computing system 103 the information associated with the file that the server computing system 102 received in step S409 and a request to store that information. The server computing system 103 may receive the information, for example a URL of the file, and the request; and the server computing system 103 may then store the information sent in step S410 in the data store 110, according to some embodiments. The information stored in the data store 110 may be attachment information which may be used to identify and/or locate a file attached to the data object. After attachment information on the server computing system 103 is updated, the process advances to step S416.

Referring again to step S407, in response to determining that a second file is attached to the data object (yes in step S407), the process advances from step S407 to step S411.

In step S411, the server computing system 102 obtains the second file which was determined in step S407 to be attached to the data object. In some embodiments, the server computing system 102 obtains the second file from the server computing system 104. In some embodiments, the server computing system 102 uses information associated with the second file to obtain the second file. For example, the server computing system 102 may send to the server computing system 104 information associated with the second file, such as a URL of the second file, and a request for the second file. In response to the request, the server computing system 104 may use the information associated with the second file to identify and/or locate the second file. Then, the server computing system 104 may send the second file to the server computing system 102. In some embodiments, the information associated with the second file, such as a URL, is information the server computing system 102 received from the server computing system 103.

In step S412, the server computing system 102 generates a third file by merging the first file received in step S405 and the second file which was determined in step S407 to be attached to the data object. In some embodiments, the server computing system 102 merges the first file and the second file according to a predetermined setting, where the predetermined setting is a rule for merging files. The predetermined setting for merging files may be set by a user, such as an administrator or other user. The predetermined setting for merging files may be a default setting. The rule for merging the files may be any suitable rule, such as the automatic merging of the newly received file (i.e., the first file) with the file (i.e., the second file) already attached to the data object. The rule for merging the files may specify an order of pages of an electronic document (i.e., the third file) resulting from the merging of the first file and the second file. For example, a newly received electronic document may be inserted after the last page of the electronic document already attached to the data object.

In some embodiments, step S412 includes converting a format of a file to a different format. For example, the server computing system 102 may convert the first file received in step S405 from an image file format to a PDF file. Any suitable file format conversion may be performed such that the first file and the second file can be merged in step S412.

Once the third file is generated in step S412, the server computing system 102 initiates an update process such that the third file will be attached to the data object and the second file will not be attached to the data object.

In step S413, the server computing system 102 sends to the server computing system 104 the third file generated in step S412 and a request to store the third file. In step S414, the server computing system 102 receives from the server computing system 104 information associated with the third file sent in step S413. The information associated with the third file may be a URL of the third file, a file name of the third file, a file path of the third file, or other information associated with the third file. By way of example, the server computing system 104 may store the third file, sent in step S413, in the data store 112 and send information, such as a URL, to the server computing system 102. The information associated with the third file may be used for identifying and/or locating the third file.

In step S415, the server computing system 102 determines whether information associated with the second file matches information, received in step S414, associated with the third file. In some embodiments, the data object includes the information associated with the second file. For example, the information associated with the second file may be attachment information included in the data object. The information associated with the second file may be a URL of the second file, a file name of the second file, a file path of the second file, or other information associated with the second file. In some embodiments, the information associated with the second file, such as a URL, is information the server computing system 102 received from the server computing system 103. In some embodiments, the information associated with the second file is the same type of information as the information associated with the third file. For example, the information associated with the second file may be a URL and the information associated with the third file may also be a URL.

To determine whether the information associated with the second file matches the information associated with the third file, the server computing system 102 compares the information received in step S414 (i.e., the information associated with the third file) to the information associated with the second file. In response to determining that the information associated with the second file matches the information associated with the third file (yes in step S415), the process advances to step S416. By way of example, the information associated with the second file may match the information associated with the third file in a case where, in response to the request to store the third file sent in step S413, the server computing system 104 overwrites the second file stored in the data store 112 with the third file and does not change the URL that refers to the electronic document stored at that location. On the other hand, in response to determining that the information associated with the second file does not match the information associated with the third file (no in step S415), the process advances to step S410. By way of example, the information associated with the second file may not match the information associated with the third file in a case where, in response to the request to store the third file sent in step S413, the server computing system 104 stores the third file in the data store 112 and associates a unique URL with the third file relative to a URL associated with the second file.

In step S410, the server computing system 102 performs a process to update attachment information on the server computing system 103. In some embodiments, step S410 includes the server computing system 102 sending to the server computing system 103 the information associated with the third file and a request to replace information, stored in the data store 110, that is associated with the second file with the information associated with the third file, such that the data object stored in the data store 110 will include the information associated with the third file and will not include the information associated with the second file. The server computing system 103 may receive the information, for example a URL of the third file, and the request; and the server computing system 103 may then replace the information associated with the second file with the information associated with the third file in the data store 110, according to some embodiments. The information stored in the data store 110 may be attachment information which may be used to identify and/or locate a file attached to the data object. After attachment information on the server computing system 103 is updated, the process advances to step S416.

In step S416, the server computing system 102 performs a process to unlock the data object that was locked in step S406. In some embodiments, the server computing system 102 sends to the server computing system 103 a request to allow operations to be performed with respect to the data object. The server computing system 102 may then receive from the server computing system 103 a response indicating the data object is unlocked such that access to the data object for performing operations with respect to the data object is allowed.

In step S417, the server computing system 102 sends to the client computing system 101 an attachment notification. The attachment notification may include information that may be displayed on the on the display 300 of the client computing system 101. Step S417 is described further with reference to the example GUI of FIG. 6.

Figure 6:
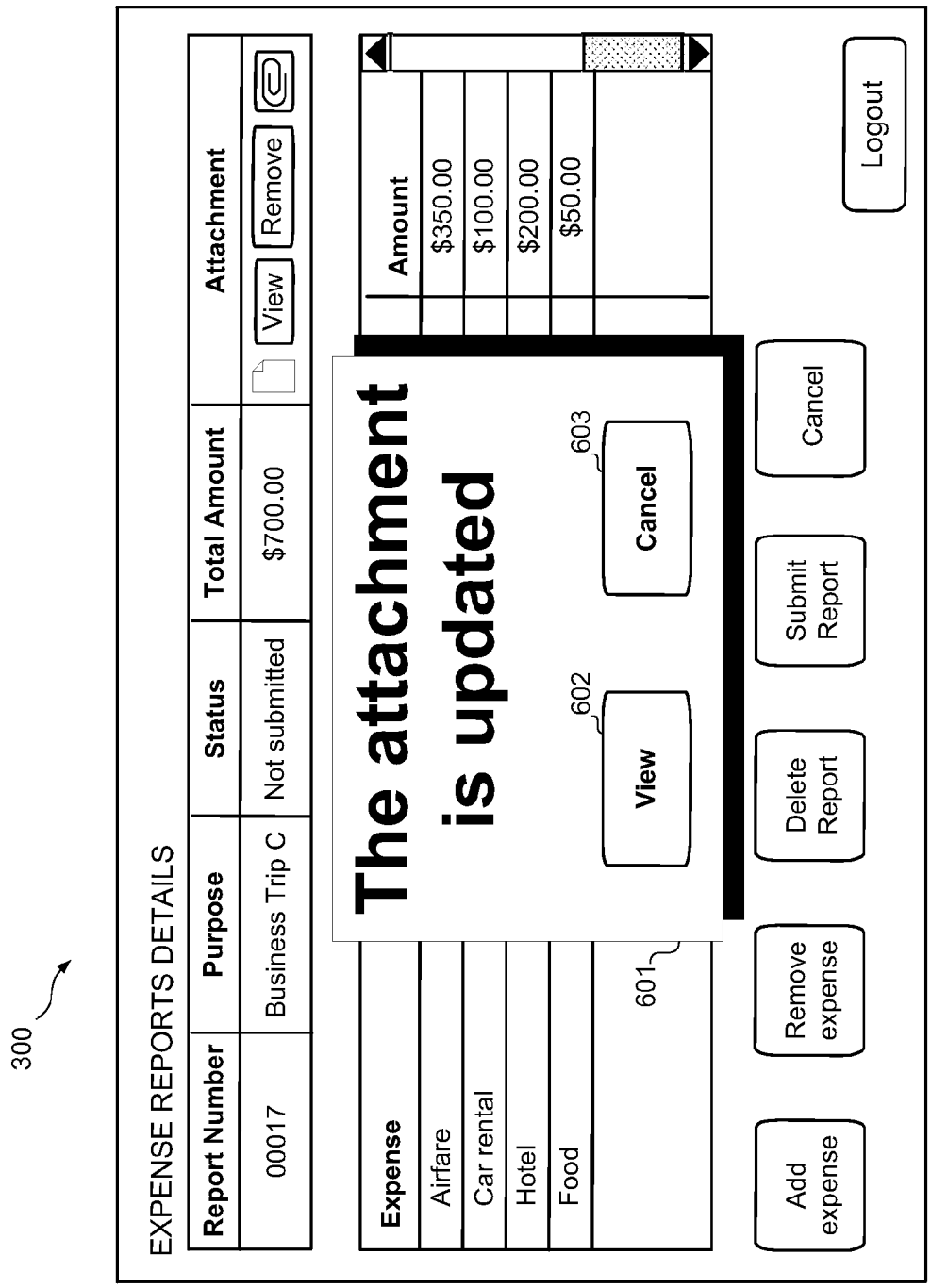
FIG. 6 illustrates an example GUI on a display of a client computing system.

FIG. 6 illustrates an example GUI on the display 300 of the client computing system 101. In some embodiments, the example GUI of FIG. 6 is rendered when a browser displays the attachment notification sent in step S417 as a window on top of the information displayed as the example GUI of FIG. 5. Accordingly, the GUI of FIG. 6 shows a screen that includes details about a selected expense report (i.e., expense report "00017") and, additionally, the window 601 and buttons 602 and 603.

The window 601 includes a textual message "The attachment is updated" indicating the attachment to the expense report has been updated. By way of example, in a case that a first file was received, in step S405, and a second file was determined, in step S407, to be attached to the data object, then the server computing system 102 may generate a third file, in step S412, and update the attachment such that the third file is attached to the data object and the second file is not attached to the data object. To notify the user that the attachment has been updated such that the newly generated third file is now attached to the data object instead of the second file, the server computing system 102 sends, in step S417, the notification information. Accordingly, the window 601 is displayed on the display 300 of the client computing system 101.

The window 601 also includes buttons 602 and 603. The View button 602 provides functionality to view the attachment that is updated. For example, a user may select the View button 602 to view the third file generated in step S412. The Cancel button 603 provides functionality to close the window 601 and cause the example GUI of FIG. 5 to again be displayed.

In some embodiments, various steps described above are performed automatically over a period of time without requiring a user input operation for the entire duration of the period. For example, referring to FIG. 4, in some embodiments, the server computing system 102 determines whether a second file is attached to the data object (step S407), obtains the second file which was determined in step S407 to be attached to the data object (step S411), generates a third file by merging the first file received in step S405 and the second file (step S412), and performs an update process such that the third file is attached to the data object and the second file is not attached to the data object, all over a period of time without requiring a user input operation for the entire duration of the period. Regarding the update process, the update process may include the server computing system 102 sending, to the server computing system 104, the third file generated in step S412 and a request to store the third file (step S413). The update process may include the server computing system 102 performing a process to update attachment information on the server computing system 103 by sending, from the server computing system 102 to the server computing system 103, information associated with the third file and a request to replace information associated with the second file with the information associated with the third file (step S410). The information associated with the third file may be information the server computing system 102 received from the server computing system 104 (step S414). The update process may include the server computing system 102 determining whether information associated with the second file matches the information associated with the third file (step S415).

By way of example, a user may select a data object and initiate a scanning operation using the client computing system 101 to capture an image of a physical document. For example, a user may select an expense report and a GUI such as the example GUI of FIG. 5 may be displayed at the client computing system 101; and the user may then initiate a scanning operation while the GUI is displayed. Then, in response to the scanning operation while the GUI is displayed, the client computing system 101 may automatically send, from the client computing system 101 to the server computing system 102, an electronic document representing the scanned physical document. In response to receiving the scanned physical document, the server computing system 102 may execute the various steps described above automatically over a period of time without requiring a user input operation for the entire duration of the period. That is, in some embodiments, once the server computing system 102 receives a user selection of a data object and a file, various steps described above are then automatically performed without further user input operation.

In response to the server computing system 102 receiving the first file, the server computing system 102 may automatically determine whether a second file is already attached to the data object (step S407). If so, the server computing system 102 may automatically obtain the second file (step S411) and generate a third file by merging the first file and the second file (step S412). Then the server computing system 102 may automatically perform the update process such that the third file is attached to the data object and the second file is not attached to the data object.

From the user's perspective, once the user scans the physical document, an electronic document representing the scanned physical document is automatically merged with a file that was already attached to the data object. Accordingly, the attachment to the data object is updated automatically without requiring a further user input operation. Other operations may also be performed automatically over the period of time without requiring a user input operation for the entire duration of the period. For example, in addition to the operations for updating the attachment, the server computing system 102 may perform the process to lock the data object (step S406), the process to unlock the data object (step S416), and/or the sending of the attachment notification (step S417).

Figure 7:
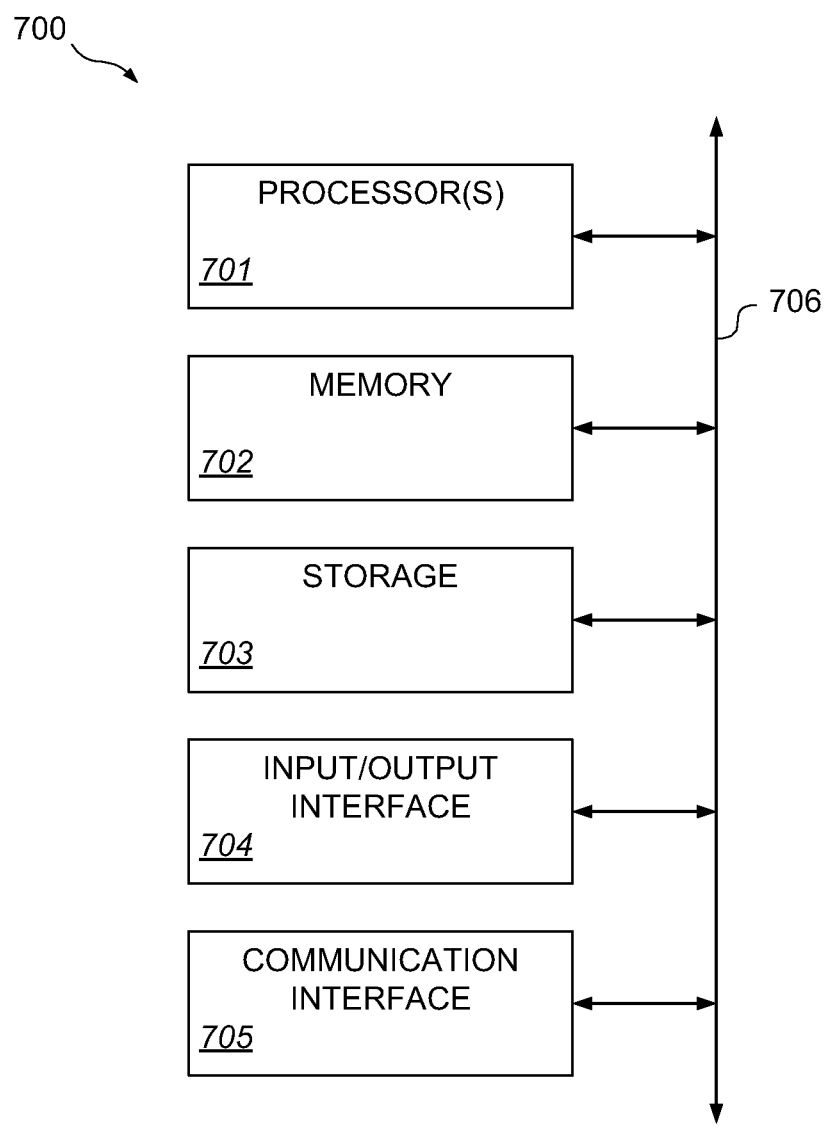
FIG. 7 illustrates an example computing system.

FIG. 7 illustrates an example computing system 700. According to various embodiments, all or a portion of the description of the computing system 700 is applicable to all or a portion of one or more of the client computing system 101, the server computing system 102, the server computing system 103, and the server computing system 104.

The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as a memory and processor) work together to perform operations on electronic data. Also, the term resource as used herein includes but is not limited to an object that can be processed at a computing system. A resource can be a portion of executable instructions or data.

In some embodiments, the computing system 700 performs one or more steps of one or more methods described or illustrated herein. In some embodiments, the computing system 700 provides functionality described or illustrated herein. In some embodiments, software running on the computing system 700 performs one or more steps of one or more methods described or illustrated herein or provides functionality described or illustrated herein. Some embodiments include one or more portions of the computing system 700.

The computing system 700 includes one or more processor(s) 701, memory 702, storage 703, an input/output (I/O) interface 704, a communication interface 705, and a bus 706. The computing system 700 may take any suitable physical form. For example, and not by way of limitation, the computing system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, PDA, a server, a tablet computer system, or a combination of two or more of these.

The processor(s) 701 include hardware for executing instructions, such as those making up a computer program. The processor(s) 701 may retrieve the instructions from the memory 702, the storage 703, an internal register, or an internal cache. The processor(s) 701 then decode and execute the instructions. Then, the processor(s) 701 write one or more results to the memory 702, the storage 703, the internal register, or the internal cache. The processor(s) 701 may provide the processing capability to execute the operating system, programs, user and application interfaces, and any other functions of the computing system 700.

The processor(s) 701 may include a central processing unit (CPU), one or more general-purpose microprocessor(s), application-specific microprocessor(s), and/or special purpose microprocessor(s), or some combination of such processing components. The processor(s) 701 may include one or more graphics processors, video processors, audio processors and/or related chip sets.

In some embodiments, the memory 702 includes main memory for storing instructions for the processor(s) 701 to execute or data for the processor(s) 701 to operate on. By way of example, the computing system 700 may load instructions from the storage 703 or another source to the memory 702. During or after execution of the instructions, the processor(s) 701 may write one or more results (which may be intermediate or final results) to the memory 702. One or more memory buses (which may each include an address bus and a data bus) may couple the processor(s) 701 to the memory 702. One or more memory management units (MMUs) may reside between the processor(s) 701 and the memory 702 and facilitate accesses to the memory 702 requested by the processor(s) 701. The memory 702 may include one or more memories. The memory 702 may be random access memory (RAM).

The storage 703 stores data and/or instructions. As an example and not by way of limitation, the storage 703 may include a hard disk drive, a floppy disk drive, flash memory, an optical disc, a magneto-optical disc, magnetic tape, or a Universal Serial Bus (USB) drive or a combination of two or more of these. In some embodiments, the storage 703 is a removable medium. In some embodiments, the storage 703 is a fixed medium. In some embodiments, the storage 703 is internal to the computing system 700. In some embodiments, the storage 703 is external to the computing system 700. In some embodiments, the storage 703 is non-volatile, solid-state memory. In some embodiments, the storage 703 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 703 may include one or more memory devices. One or more program modules stored in the storage 703 may be configured to cause various operations and processes described herein to be executed.

The I/O interface 704 includes hardware, software, or both providing one or more interfaces for communication between the computing system 700 and one or more I/O devices. The computing system 700 may include one or more of these I/O devices, where appropriate. One or more of these I/O devices may enable communication between a person and the computing system 700. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 704 includes one or more device or software drivers enabling the processor(s) 701 to drive one or more of these I/O devices. The I/O interface 704 may include one or more I/O interfaces.

The communication interface 705 includes hardware, software, or both providing one or more interfaces for communication (such as, for example, packet-based communication) between the computing system 700 and one or more other computing systems or one or more networks. As an example and not by way of limitation, the communication interface 705 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 705 for it. As an example and not by way of limitation, the computing system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system 700 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. The computing system 700 may include any suitable communication interface 705 for any of these networks, where appropriate. The communication interface 705 may include one or more communication interfaces 705.

The bus 706 interconnects various components of the computing system 700 thereby enabling the transmission of data and execution of various processes. The bus 706 may include one or more types of bus structures including a memory bus or memory controller, a peripheral bus, and a local bus using any of a variety of bus architectures.

Figure 8:
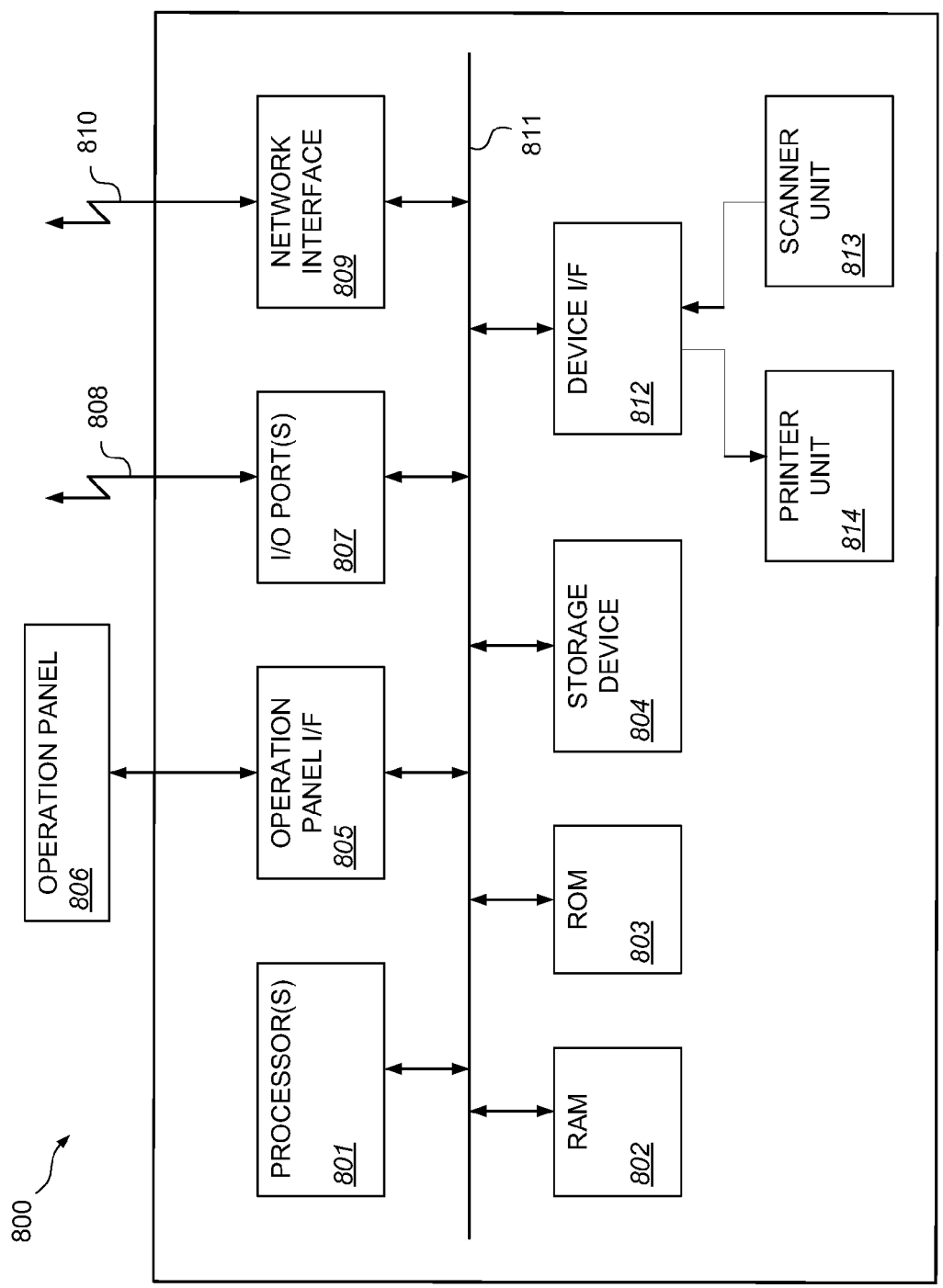
FIG. 8 illustrates an example image processing device.

FIG. 8 illustrates an example image processing device 800. In some embodiments, the client computing system 101 of FIG. 1 comprises the image processing device 800. The image processing device 800 of FIG. 8 is a multifunction peripheral having a scanning function in addition to printing, copying and other functions. However, it will be understood that various other implementations of an image processing device are within the scope of the present invention. For example, various components, modules, functions, and/or configurations of the image processing device 800 of FIG. 8 could be combined, deleted, or modified to form further implementations. Further by way of example, in some embodiments, other devices (for example, other devices having scanning capabilities) and/or computing systems (for example, a computer connected to a scanner) may be implemented as the image processing device 800.

In some embodiments, the image processing device 800 performs one or more operations described herein. In some embodiments, the image processing device 800 provides functionality described herein. In some embodiments, software running on the image processing device 800 performs one or more operations described herein.

The image processing device 800 includes one or more processor(s) 801. The processor(s) 801 include a central processing unit (CPU) that performs overall control functions for the image processing device 800. The CPU uses a random access memory (RAM) 802 as a work area while executing instructions. The CPU executes instructions of various programs stored in one or more memory devices. For example, the CPU executes programs stored in a read only memory (ROM) 803 and in a storage device 804.

In some embodiments, the processor(s) 801 include one or more processors in addition to the CPU. By way of example, the processor(s) 801 may include one or more general-purpose microprocessor(s), application-specific microprocessor(s), and/or special purpose microprocessor(s). Additionally, in some embodiments the processor(s) 801 may include one or more internal caches for data or instructions.

The processor(s) 801 provide the processing capability required to execute an operating system, application programs, and various other functions provided on the image processing device 800. The processor(s) 801 perform or cause components of the image processing device 800 to perform various operations and processes described herein, in accordance with instructions stored in one or more memory devices.

The RAM 802 is used as a work area when the processor(s) 801 execute various instructions, such as those making up computer programs stored in the ROM 803 and/or the storage device 804. The RAM 802 may be used as a temporary storage area for various data, including input image data. The RAM 802 may be used as a cache memory. In some embodiments, the RAM may be dynamic RAM (DRAM) or static RAM (SRAM).

The ROM 803 stores data and programs having computer-executable instructions for execution by the processor(s) 801. In some embodiments, the ROM 803 is a boot ROM, storing instructions for the booting process. In some embodiments, the ROM 803 may be flash memory.

The storage device 804 stores application data, program modules and other information. One or more program modules stored in the storage device 804 are configured to cause various operations and processes described herein to be executed. For example, in some embodiments, the storage device 804 stores instructions for generating and providing to a computing system a web page including an embedded executable program which, when executed on the computing system, is operable to obtain a ticket-granting ticket stored on the computing system and send the ticket-granting ticket to another computing system; determining whether a user associated with the ticket-granting ticket is authorized to access a protected resource comprising a web page; or a combination of these, in accordance with embodiments described herein. In some embodiments, the application 102 resides on the storage device 804 and executes on the image processing device 800.

The storage device 804 also stores other programs and data to be processed. For example, the storage device 804 stores an operating system including programs and data for managing hardware and software components of the image processing device 800. Applications on the image processing device 800 may utilize the operating system to perform various operations. The storage device 804 may further store other programs and/or drivers that enable various functions of the image processing device 800, graphical user interface (GUI) functions, and/or processor functions. The storage device 804 may also store data files including, for example, image data, user data, configuration information, GUI components, such as graphical elements or templates, or other data required by the image processing device 800.

In some embodiments, the image processing device 800 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 800. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

An operation panel interface 805 provides output signals to and receives input signals from an operation panel 806. Regarding the output signals, the operation panel interface 805 provides GUI data to the operation panel 806 for display on a liquid crystal display (LCD). Regarding the input signals, the operation panel interface 805 receives input signals based on user input operations at the operation panel 806 and relays the input signals to the processor(s) 801. In some embodiments, the operation panel 806 includes a touch sensitive element operable to receive user input operations or commands based on the touching of graphical objects displayed on the LCD. In some embodiments, the operation panel 806 includes a hard key panel.

The image processing device 800 includes one or more input/output (I/O) port(s) 807. The I/O port(s) 807 may include any suitable interface type such as a universal serial bus (USB) port, FireWire port (IEEE-1394), serial port, parallel port, or AC/DC power connection port. The I/O port(s) 807 enable one or more external device(s) 808 to communicate with the image processing device 800 when the external device(s) 808 is/are connected to the I/O port(s) 807. Examples of external devices 808 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 809 includes hardware, software, or both providing one or more interfaces for communication (such as, for example, packet-based communication) between the image processing device 800 and one or more other computing systems or one or more networks 810. As an example and not by way of limitation, the network interface 809 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 810 and any suitable network interface 809 for it. As an example and not by way of limitation, the image processing device 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 810 may be wired or wireless. As an example, the image processing device 800 may communicate with a wireless PAN (WPAN) (such as, for example, a BLUETOOTH WPAN), a WI-FI network, a WI-MAX network, or other suitable wireless network or a combination of two or more of these. The image processing device 800 may include any suitable network interface 809 for any of these networks 810, where appropriate.

A system bus 811 interconnects various components of the image processing device 800 thereby enabling the transmission of data and execution of various processes. The system bus 811 may include one or more types of bus structures including a memory bus or memory controller, a peripheral bus, and a local bus using any of a variety of bus architectures.

The device interface 812 is connected to the scanner unit 813 and to the printer unit 814. The device interface 812 performs synchronous/asynchronous conversion of image data.

The scanner unit 813 includes a light source and an image sensor. The scanner unit 813 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 813 includes an optical system (for example, mirrors, lens) that directs the light to the image sensor. After the image sensor generates the electrical signals, an analog-to-digital converter converts the electrical signals to digital image data representing the scanned physical document. The scanner unit 813 then outputs the digital image data to one or more other components of the image processing device 800 via the device interface 812.

The printer unit 814 is an image output device for printing on a sheet an image corresponding to image data. In response to a print command received at the image processing device 800, the printer unit 814 receives image data via the device interface 812 and outputs to a sheet an image corresponding to the image data.

Various above-described operations performed by the client computing system 101, the server computing system 102, the server computing system 103, and the server computing system 104 may be executed and/or controlled by one or more applications running on the client computing system 101, the server computing system 102, the server computing system 103, and the server computing system 104, respectively. The above description serves to explain principles of the invention; but the invention should not be limited to the examples described above. For example, the order and/or timing of some of the various operations may vary from the examples given above without departing from the scope of the invention. Further by way of example, the type of network and/or computing systems may vary from the examples given above without departing from the scope of the invention. Other variations from the above-recited examples may also exist without departing from the scope of the invention.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

What is claimed is:

1. A method comprising:
   receiving, at a first server computing system from an image processing device, a request to access a data object associated with an application on a second server computing system;
   sending, from the first server computing system to the second server computing system, a request for the data object;
   receiving, at the first server computing system from the second server computing system, the data object;
   receiving, at the first server computing system from the client computing system, a first file, the first file being an electronic document representing a physical document created by the image processing device;
   determining whether the received data object includes a second file attach thereto, the second file being different from the first file;
   in response to determining that the second file is attached to the data object, obtaining, at the first server computing system, the second file and merging the first file and the second file to generate a third file, the third file including data contained in each of the first and second files; and
   performing an update process on the data object by attaching the third file to the data object such that the second file is not attached to the data object.

2. The method of claim 1, wherein
   the first file is created by the image processing device scanning a physical document to create the electronic document representing the physical document.

3. The method of claim 1, wherein the data object includes information associated with the second file, and
   wherein the determining that the second file is attached to the data object comprises determining that the second file is attached to the data object based on the information associated with the second file.

4. The method of claim 3, wherein the obtaining the second file comprises using the information associated with the second file to obtain the second file from a third server computing system.

5. The method of claim 1, further comprising:
   sending, from the first server computing system to the second server computing system, a request to prevent a second image processing device from accessing the data object for performing operations with respect to the data object.

6. The method of claim 1, wherein the generating the third file comprises generating the third file by merging the first file and the second file according to a predetermined setting, the predetermined setting comprising a rule for merging files.

7. The method of claim 1, wherein the performing the update process comprises sending, from the first server computing system to a third server computing system, the third file and a request to store the third file.

8. The method of claim 7, wherein the data object includes information associated with the second file, the performing the update process further comprising:
   receiving, at the first server computing system from the third server computing system, information associated with the third file; and
   sending, from the first server computing system to the second server computing system, the information associated with the third file and a request to replace the information associated with the second file with the information associated with the third file such that the data object will include the information associated with the third file and will not include the information associated with the second file.

9. The method of claim 8, wherein the performing the update process further comprises determining whether the information associated with the second file matches the information associated with the third file,
   wherein the sending the request to replace the information associated with the second file with the information associated with the third file is performed in response to determining that the information associated with the second file does not match the information associated with the third file.

10. A non-transitory computer-readable medium storing instructions that, when executed by one or more processors, cause the one or more processors to perform operations comprising:
    receiving, at a first server computing system from an image processing device, a request to access a data object associated with an application on a second server computing system;
    sending, from the first server computing system to the second server computing system, a request for the data object;
    receiving, at the first server computing system from the second server computing system, the data object;
    receiving, at the first server computing system from the client computing system, a first file, the first file being an electronic document representing a physical document created by the image processing device;
    determining whether the received data object includes a second file attach thereto, the second file being different from the first file;
    in response to determining that the second file is attached to the data object, obtaining, at the first server computing system, the second file and merging the first file and the second file to generate a third file, the third file including data contained in each of the first and second files; and
    performing an update process on the data object by attaching the third file to the data object such that the second file is not attached to the data object.

11. A system comprising:
    a central processing unit; and
    a memory coupled to the central processing unit, the memory storing instructions that, when executed by the central processing unit, cause the central processing unit to perform operations comprising:
    receiving, at a first server computing system from an image processing device, a request to access a data object associated with an application on a second server computing system;
    sending, from the first server computing system to the second server computing system, a request for the data object;
    receiving, at the first server computing system from the second server computing system, the data object;
    receiving, at the first server computing system from the client computing system, a first file, the first file being an electronic document representing a physical document created by the image processing device;

determining whether the received data object includes a second file attach thereto, the second file being different from the first file;

in response to determining that the second file is attached to the data object, obtaining, at the first server computing system, the second file and merging the first file and the second file to generate a third file, the third file including data contained in each of the first and second files; and performing an update process on the data object by attaching the third file to the data object such that the second file is not attached to the data object.

12. The system of claim 11, wherein
the first file is created by the image processing device scanning, a physical document to create the electronic document representing the physical document.

13. The system of claim 11, wherein the data object includes information associated with the second file, and
wherein the determining that the second file is attached to the data object comprises determining that the second file is attached to the data object based on the information associated with the second file.

14. The system of claim 13, wherein the obtaining the second file comprises using the information associated with the second file to obtain the second file from a third server computing system.

15. The system of claim 11, the operations further comprising:
sending, from the first server computing system to the second server computing system, a request to prevent a second image processing device from accessing the data object for performing operations with respect to the data object.

16. The system of claim 11, wherein the generating the third file comprises generating the third file by merging the first file and the second file according to a predetermined setting, the predetermined setting comprising a rule for merging files.

17. The system of claim 11, wherein the performing the update process comprises sending, from the first server computing system to a third server computing system, the third file and a request to store the third file.

18. The system of claim 17, wherein the data object includes information associated with the second file, the performing the update process further comprising:
receiving, at the first server computing system from the third server computing system, information associated with the third file; and
sending, from the first server computing system to the second server computing system, the information associated with the third file and a request to replace the information associated with the second file with the information associated with the third file such that the data object will include the information associated with the third file and will not include the information associated with the second file.

19. The system of claim 18, wherein the performing the update process further comprises determining whether the information associated with the second file matches the information associated with the third file,
wherein the sending the request to replace the information associated with the second file with the information associated with the third file is performed in response to determining that the information associated with the second file does not match the information associated with the third file.

* * * * *